US011931707B1

(12) United States Patent
Hockmeyer

(10) Patent No.: US 11,931,707 B1
(45) Date of Patent: Mar. 19, 2024

(54) SYSTEM FOR AGGLOMERATE MIXING HAVING A ROTOR AND ANGULAR SLOTTED STATOR

(71) Applicant: Herman Hockmeyer, Harrison,, NJ (US)

(72) Inventor: Herman Hockmeyer, Harrison,, NJ (US)

( * ) Notice: Subject to any disclaimer, the term of this patent is extended or adjusted under 35 U.S.C. 154(b) by 0 days.

(21) Appl. No.: 18/510,871

(22) Filed: Nov. 16, 2023

(51) Int. Cl.
*B01F 27/81* (2022.01)
*B01F 23/50* (2022.01)
*B01F 27/27* (2022.01)

(52) U.S. Cl.
CPC ............ *B01F 27/812* (2022.01); *B01F 27/27* (2022.01); *B01F 23/56* (2022.01)

(58) Field of Classification Search
CPC .... B01F 23/56; B01F 27/812; B01F 25/4511; B01F 27/27; B01F 27/8111; B01F 33/862; B01F 27/40; B01F 27/41; B01F 27/411; B01F 27/412
USPC .................................................. 366/302, 305
See application file for complete search history.

(56) References Cited

U.S. PATENT DOCUMENTS 2,628,081 A * 2/1953 Laird ...................... B01F 27/80 241/46.11
3,194,540 A * 7/1965 Hager ................. B01F 27/2711 241/86
3,195,867 A * 7/1965 Mould, Jr. ............ B01F 27/271 99/466
6,000,840 A * 12/1999 Paterson ............... B01F 27/812 241/46.11
6,783,271 B1 * 8/2004 Makarenko ............. B01F 23/41 366/181.4
2003/0107948 A1 * 6/2003 Jacob ...................... B01F 23/53 366/181.4

FOREIGN PATENT DOCUMENTS

BE 1022904 B1 * 10/2016
CH 359346 A * 12/1961
CN 115301101 A * 11/2022
DE 967436 C * 11/1957
DE 1036818 B * 8/1958
DE 1040513 B * 10/1958
DE 1101918 B * 3/1961
DE 1140440 B * 11/1962
(Continued)

OTHER PUBLICATIONS

Machine translation of DE1040513 obtained Dec. 2023.*

*Primary Examiner* — Charles Cooley
(74) *Attorney, Agent, or Firm* — Stuart M. Goldstein

(57) ABSTRACT

A rotor-stator system for agglomerate mixing apparatus utilizes a unique rotor-stator mixer assembly which combines a high efficiency rotor with unique stator element designs to address the limitations of prior rotor-stator mixer assemblies, including the dispersal of large agglomerate and problem of heat build-up. The stator elements have a variety of slot openings in different sizes and shapes whose inside walls are slanted in an acute attack angle that will generate circumferential, rather than exit flow. These slot configurations enable rapid large agglomerate reduction into smaller and smaller agglomerates and ultimately down to particle size without the need to change stator configuration, which is already built into the device.

6 Claims, 7 Drawing Sheets

(56) References Cited

FOREIGN PATENT DOCUMENTS

| | | | | | |
|---|---|---|---|---|---|
| EP | 290033 | A | * | 11/1988 | ............ B01F 15/027 |
| EP | 1787958 | A1 | * | 5/2007 | ............ B01F 3/1221 |
| FR | 888287 | A | * | 12/1943 | |
| FR | 2233089 | A1 | * | 1/1975 | |
| FR | 2970879 | A1 | * | 8/2012 | .......... B01F 15/0227 |
| JP | 52001756 | A | * | 1/1977 | .......... B01F 3/04539 |
| JP | 60061028 | A | * | 4/1985 | .............. B01F 7/164 |
| KR | 20160016004 | A | * | 2/2016 | |
| WO | WO-2020091640 | A1 | * | 5/2020 | .......... B01F 7/00241 |
| WO | WO-2020185135 | A1 | * | 9/2020 | |
| WO | WO-2021034252 | A1 | * | 2/2021 | .............. B01F 27/27 |

* cited by examiner

PRIOR ART

SYSTEM FOR AGGLOMERATE MIXING HAVING A ROTOR AND ANGULAR SLOTTED STATOR

FIELD OF THE INVENTION

The present invention relates generally to the incorporation of a unique stator to be utilized in a rotor-stator assembly for the dispersion of agglomerate particles in agglomerate mixing systems.

BACKGROUND OF THE INVENTION

High speed rotor-stator mixer assemblies are capable of producing finer dispersions of solids into liquids than typical saw tooth impellors. This is a result of the trapping of agglomerated particles suspended in a liquid between the high-speed rotating rotor and the stationary stator and then tearing them apart, so they can be separated, in many cases, down to the original particle size.

These rotor-stator mixer assemblies are designed to deliver higher shear rates than open saw tooth blades, commonly used in the manufacture of paints, inks, cosmetics, lotions, and similar applications. Their purpose is to produce a finer dispersion with smaller and fewer agglomerates than can be achieved with typical dispersion blades. Such rotor-stator assemblies accomplish this objective, but with significant limitations. Heat generation is one of the primary problems normally associated with rotor-stator assemblies.

Disperser blades create both shear and turbulence. The shear is less intense than a rotor-stator because the dispersion itself is the backstop for the rotating blade, absorbing energy and creating turbulence as it exits the face of the impellor. In this case, turbulence is beneficial since it provides aggressive circumferential flow as the streamlines of laminar flow (shear) deteriorate into turbulent flow, promoting mixing and more temperature uniformity in the tank. Viscosity and density of the feedstock influence flow. Characteristics of the flow such as levels of thixotropy, dilatancy and pseudo plasticity, all affect the flow.

Rotor-stator mixers assemblies create higher shear rates, but less turbulence than disperser blades. The shear is generated by the rotor as it passes closely to the stator and exits through escape openings in the stator. These openings are uniform and unique to the individual stator and are dependent on the task at hand. Regardless of the shape or size openings the agglomerate is sheared by the rotor, impacted, wiped and torn against the inner wall of the stator and forced through its openings. The resulting flow is momentarily laminar, immediately followed by turbulence. Again, flow characteristics come into play and affect performance.

As flow is inhibited by the constrictive openings in the stator, so too is mixing. The radial discharge, when confronted with increasing viscosity from increasing particle surface area vehicle demand, rapidly deteriorates mixing. This results in hot spots around the rotor-stator assembly and batch temperatures become segmented. One solution to this problem is to add supplementary agitation to aid in mixing. This becomes more apparent as flow (mixing) becomes more and more lethargic. The cost of the equipment for the process tends to increase as a function of the difficulties.

There is an area where supplementary agitation can be avoided if the shear intensity can be complimented by the level of mixing intensity of a typical disperser blade. However, this is for applications within the range of a disperser.

SUMMARY OF THE INVENTION

The present invention comprises a rotor-stator mixer assembly which combines a high efficiency rotor with unique stator designs to address the limitations of prior rotor-stator mixer assemblies, including the dispersal of large agglomerate and the problem of heat build-up. The stator has a variety of slot openings in different sizes and shapes. These slot configurations enable rapid large agglomerate reduction into smaller and smaller agglomerates and ultimately down to particle size without the need to change stator configuration, which it is already built into the device.

The walls of the stator bodies are thick enough to have the openings cut in at an attack angle (typically 45°) that will generate circumferential, rather than radial, exit flow. This promotes rapid slicing and dicing of larger materials such as rubber pellets. Clearance between the tips of the rotor and the inside diameter of the stator affects both the discharge rate and the shear rate/stress calculated in reciprocal seconds. The tighter the tolerances and exit slot openings, the higher the shear and the lower the discharge rate. Increasing the open area of the slot openings can be accomplished by increasing their number and positioning. However, this is also a function of the internal pressure generated within the device and flow characteristics of the agglomerate. Peripheral speed of the rotor influences these factors. As pellet size is reduced, the efficiency of the larger slot opening is also reduced. This occurs when the smaller size slot openings pick up efficiency to continue size reduction of the solids until even the smallest slot openings lose efficiency.

The solubilization of rubber crumbs is best done on this device. In the event the rotor-stator is used to disperse solids instead of solubilizing, media milling can finish the dispersion.

As these improvements enhance the shear and flow, they affect the temperature of the agglomerate, both in uniformity and acceleration. There is a further enhancement that can help control temperature, if necessary. Attaching an appropriate sized jacket to the rotor-stator assembly further controls the heat exchange and "fine tunes" the agglomerate to maintain the desired temperature equilibrium. These aspects are true for both the lift-out immersive and the in-line vacuum designs.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
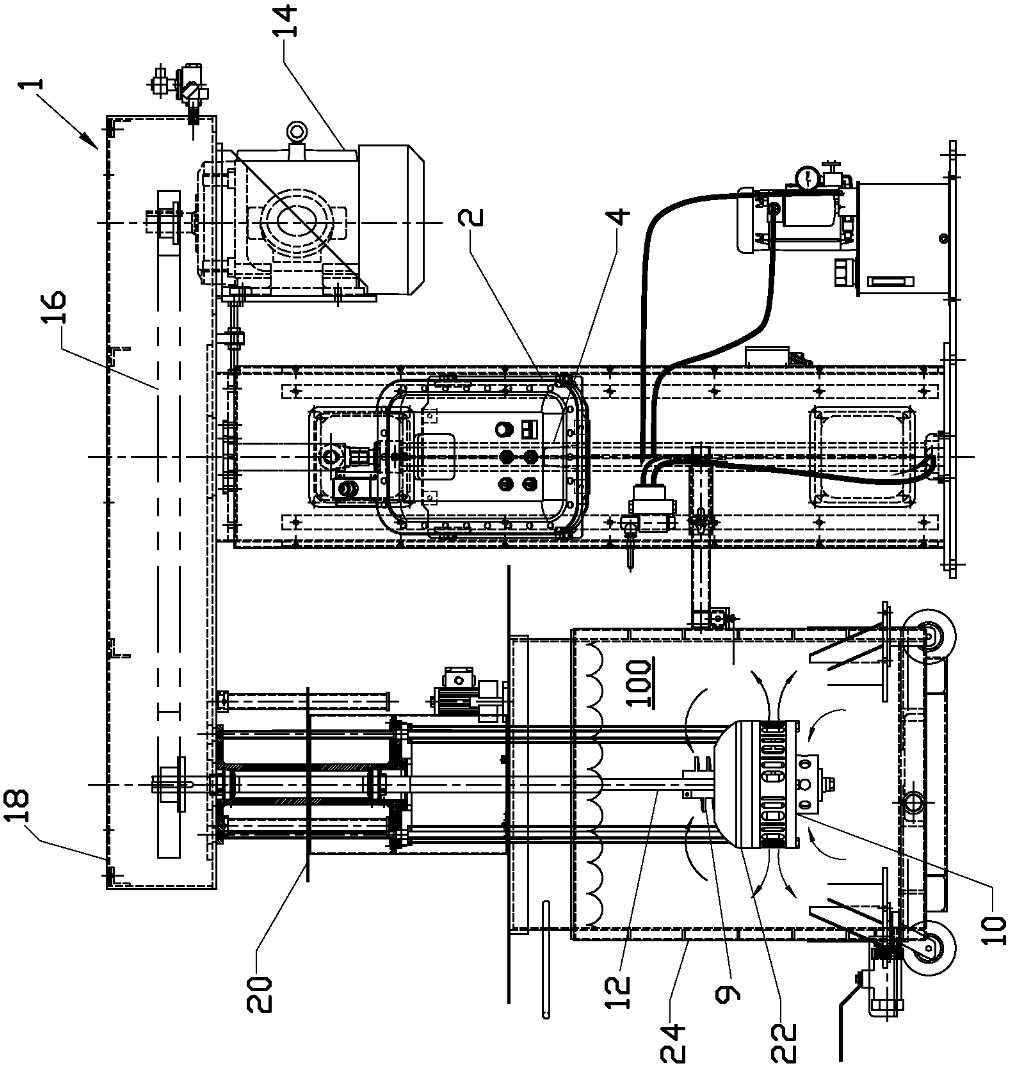
FIG. 1 shows a typical agglomerate mixing apparatus, employing the rotor-stator assembly of the present invention.
Figure 2:
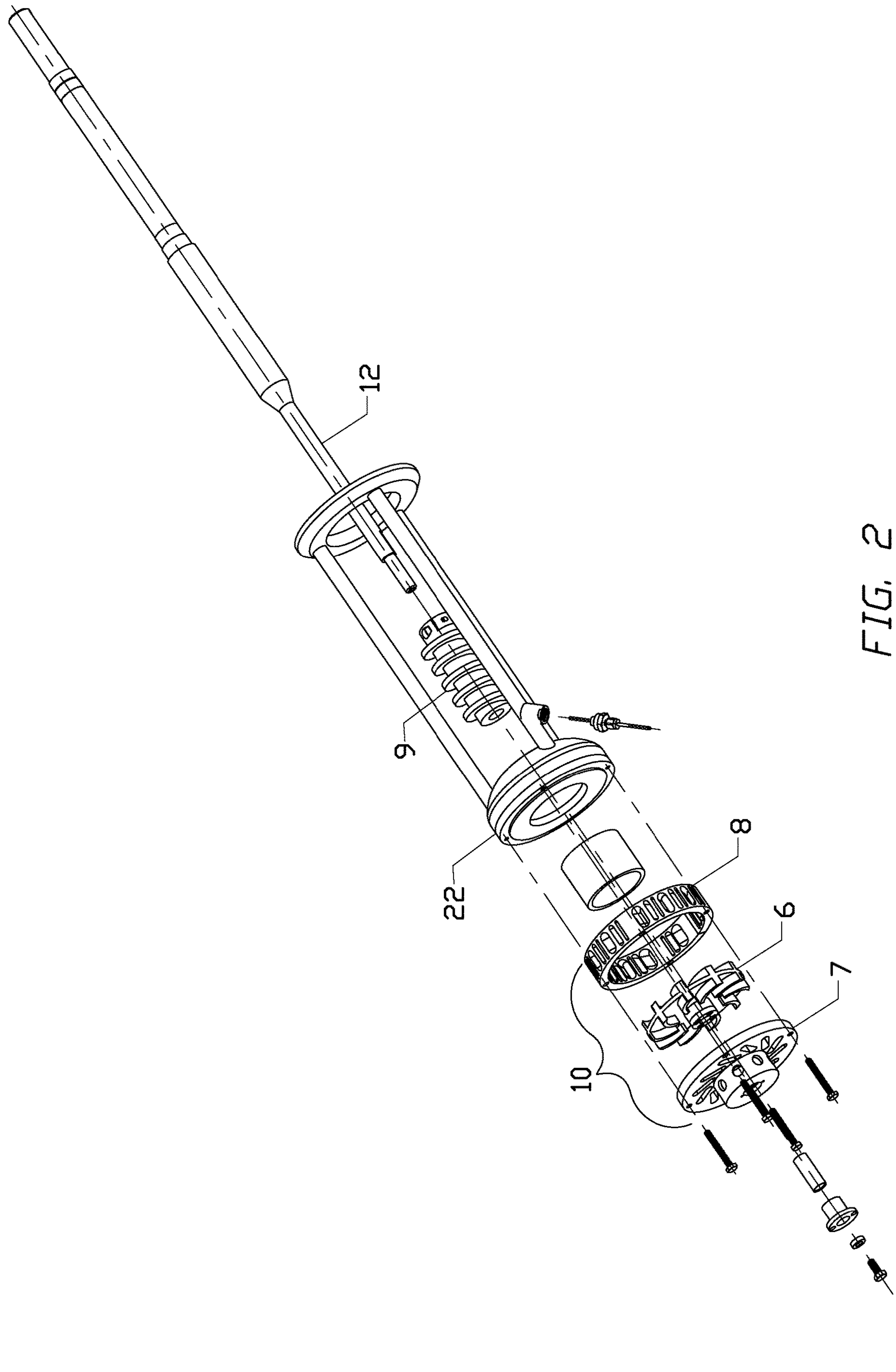
FIG. 2 is an exploded view of the significant components of the rotor-stator assembly of the present invention.

The rotor-stator system for agglomerate mixers, shown in FIG. 1, comprises mixing apparatus 1, currently in use, having control station 2, hydraulic hoist 4, and power means to rotate rotor element 6, via driveshaft 12, within stator element 8 of the present invention. Rotor element 6, stator element 8, and stator bottom plate 7 (see FIG. 2) make up rotor-stator assembly 10, connected to auger component 9. The power means includes motor 14 and the appropriate belt, pulley system 16 in apparatus head 18, and bearing housing 20. Rotor-stator assembly 10, supported by rack dome assembly 22, is lowered via hoist 4 into mixing tank 24, where the components within the rack dome assembly, including the rotor-stator assembly, are immersed in agglomerate 100 for dispersion.

Figure 5:
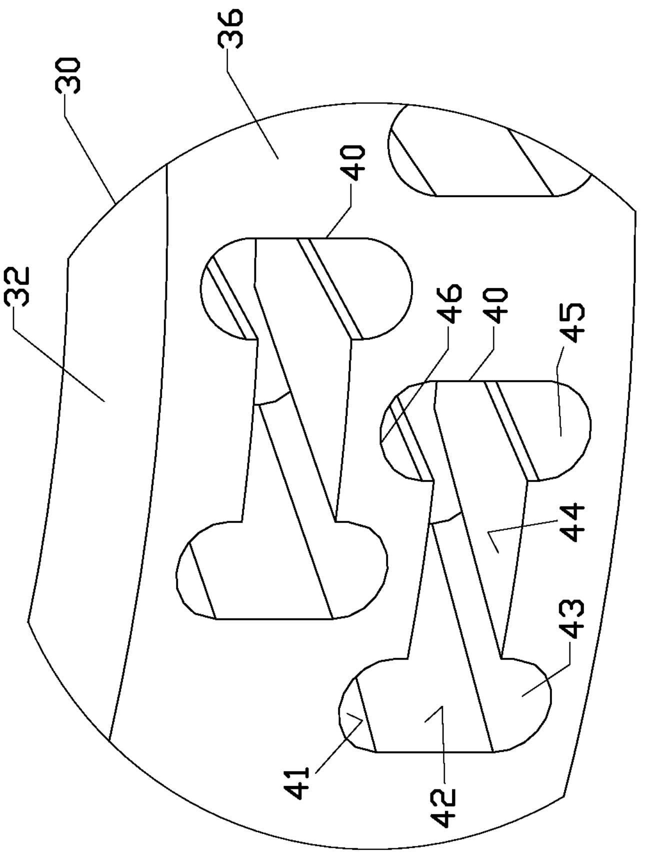
FIG. 5 is a detailed view taken from FIG. 2.
Figure 4:
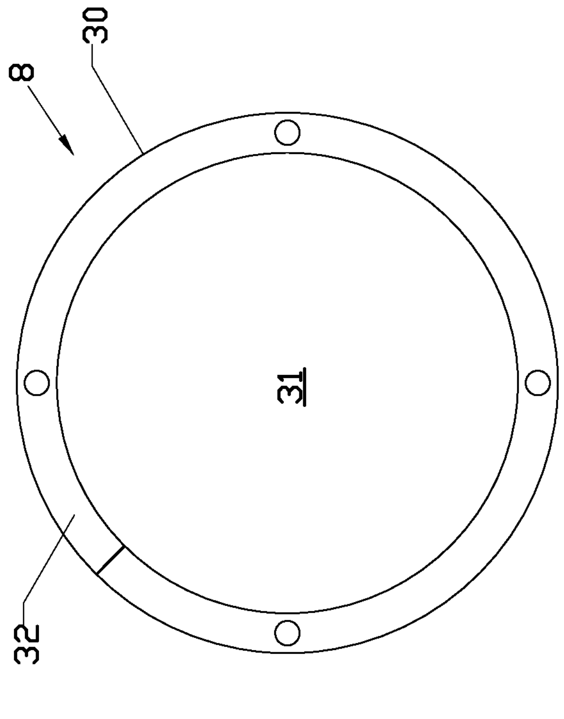
FIG. 4 is the top view of the stator element of the present invention.
Figure 3:
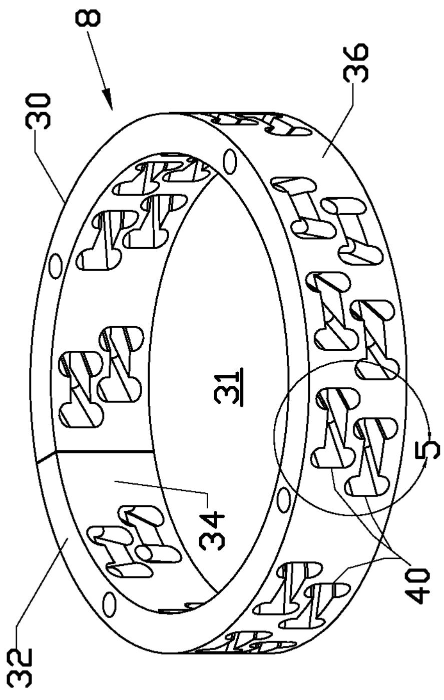
FIG. 3 is a perspective view of the stator element of the present invention.

With specific reference to FIGS. 3, 4, and 5, stator element 8 of the present invention comprises a circular stator body 30 in the form of a ring with inside open area 31. Stator body 30 has top surface 32, interior surface 34 having an inner circumference, this interior surface extending around the entire inner circumference of the body, and exterior surface 36 having an outer circumference, this exterior surface extending around the entire outer circumference of the body. Stator body 30 also has a plurality of slot openings 40 extending through the stator body from exterior surface 36 to interior surface 34, leading into open area 31. Slot openings 40 are each configured as identical stylized, interlocking "H" shapes, uniformly extending around exterior surface 36. Each of the slot openings 40 have inside walls 41*a*, 42*a*, 43*a*, and 44*a*, seen in detail in FIG. 5, which are slanted inward towards open area 31, positioned at an acute angle, e.g. 45°, in relation to top surface 32 of stator body 30.

Figure 8:
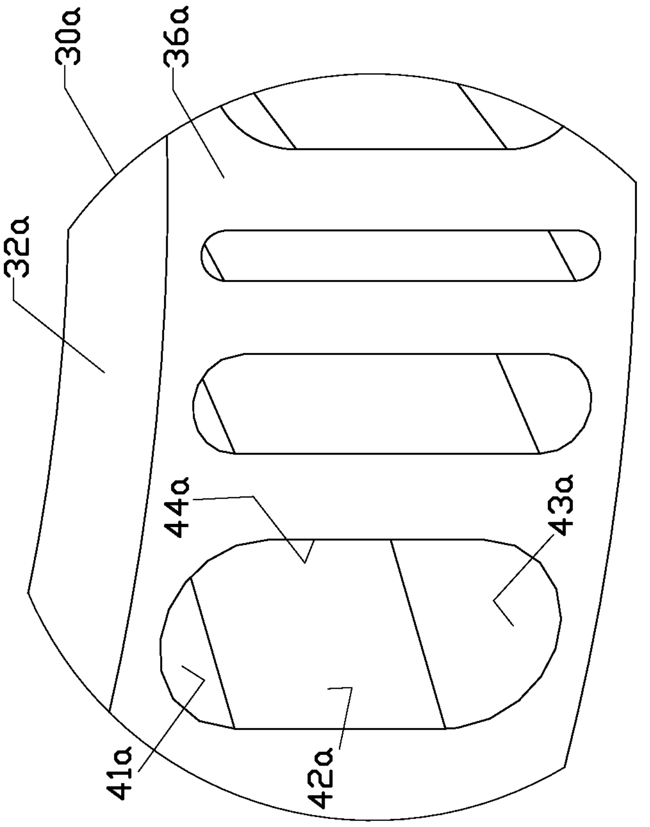
FIG. 8 is a detailed view taken from FIG. 5.
Figure 7:
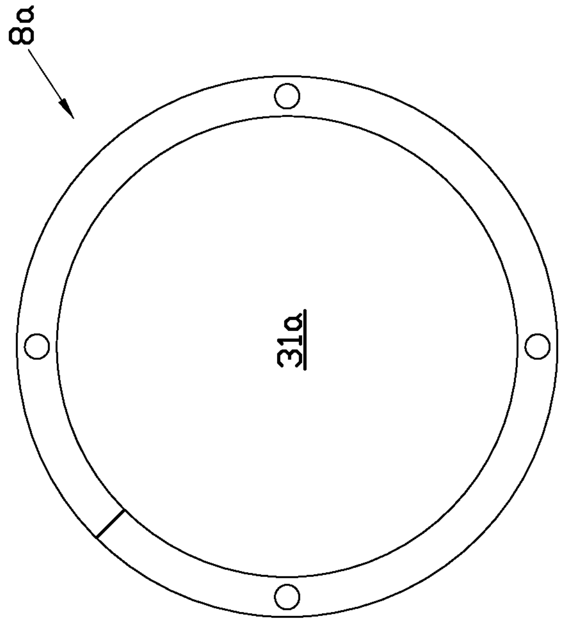
FIG. 7 is the top view of the stator element of FIG. 5.
Figure 6:
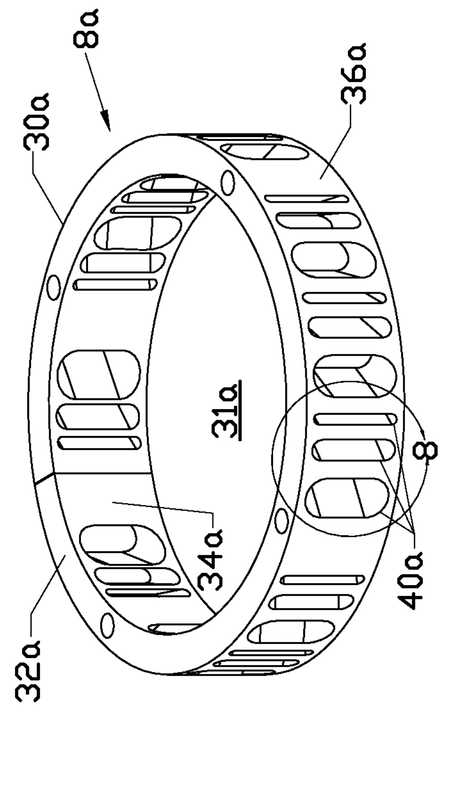
FIG. 6 is a perspective view of another embodiment of the stator element of the present invention.

FIGS. 6, 7, and 8 illustrates an alternate embodiment of the present invention. Stator element 8*a* is similar in configuration and shape to stator element 8, but its slot openings 40*a* extend through stator body 30*a* from exterior surface 36*a* to interior surface 34*a*, leading into open area 31*a*. Slot openings 40*a* take the shape of differently shaped apertures, uniformally extending around exterior surface 36*a*. Each slot opening 40*a* has inside walls 41*a*, 42*a*, 43*a*, and 44*a*, seen in detail in FIG. 8, which are slanted inward towards open area 31*a*, positioned at an acute angle, e.g. 45°, in relation to top surface 32*a* of stator body 30*a*.

Figure 9:
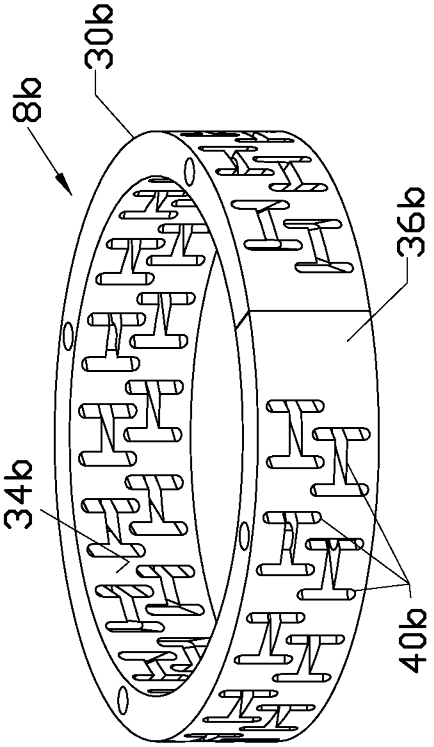
FIG. 9 is a perspective view of a third embodiment of the stator element of the present invention.

FIG. 9 illustrates another embodiment of the present invention. Stator element 8*b* is similar in configuration and shape to stator element 8, but its slot openings 8*b* are a different stylized, interlocking "H" design shape. Slot openings 40*b* also uniformly extend in an inward slant, from exterior surface 36*b* through interior surface 34*b* of stator body 30*b*.

Figure 10:
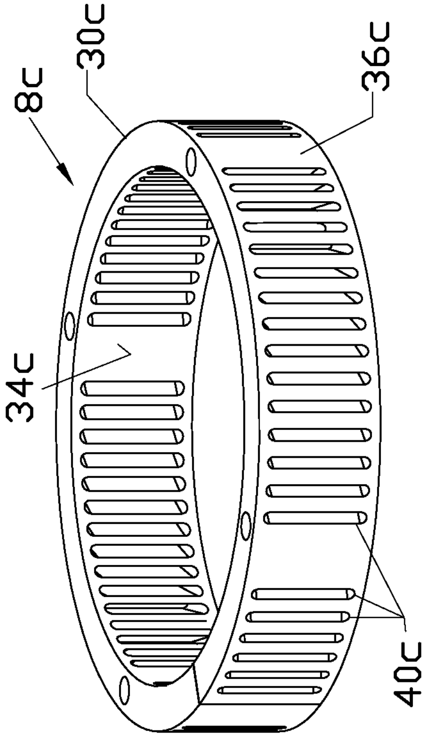
FIG. 10 is a perspective view of a fourth embodiment of the stator element of the present invention.

FIG. 10 illustrates another embodiment of the present invention. Stator element 8*c* is similar in configuration and shape to stator element 8*a*, but its slot openings 40*c* take the shape of elongated, parallel aligned apertures, which also uniformly extend in an inward slant, from exterior surface 36*c* through interior surface 34*c* of stator body 30*c*.

Figure 11:
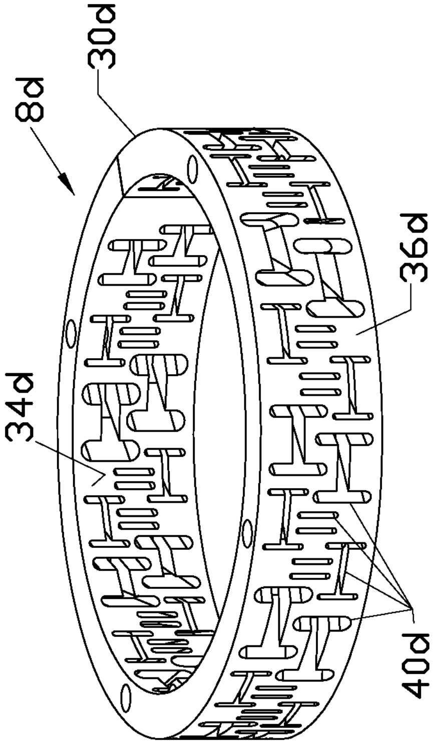
FIG. 11 is a perspective view of a fifth embodiment of the stator element of the present invention.

FIG. 11 illustrates another embodiment of the present invention. Stator element 8*d* is similar in configuration and shape to stator element 8, but its slot openings 40*d* comprise patterns of different size stylized, interlocking "H" shaped slot openings and apertures, uniformly extending, in an inward slant, from exterior surface 36*d* through interior surface 34*d* of stator body 30*d*.

Figure 13:
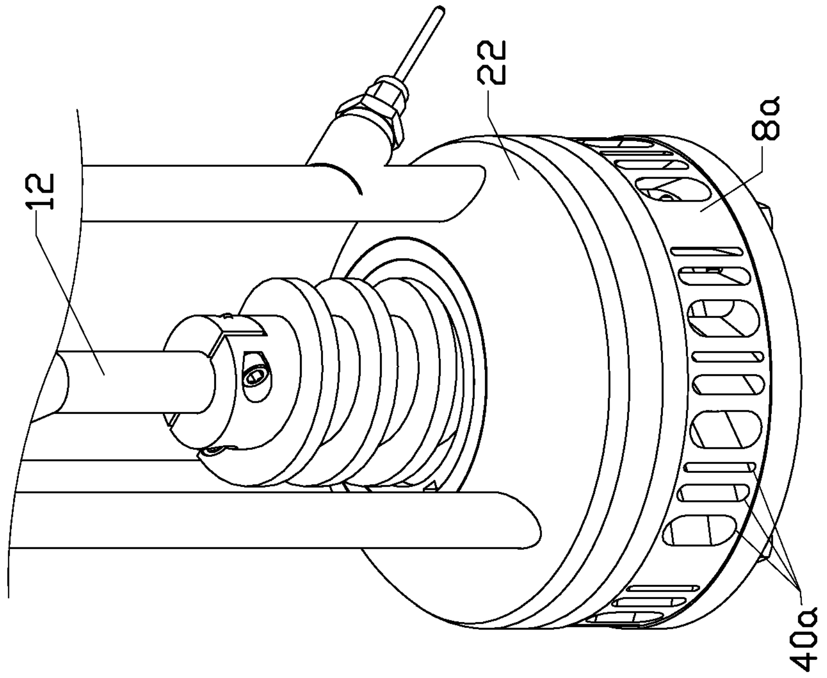
FIG. 13 shows a perspective view of the rotor stator assembly of the present invention.
Figure 12:
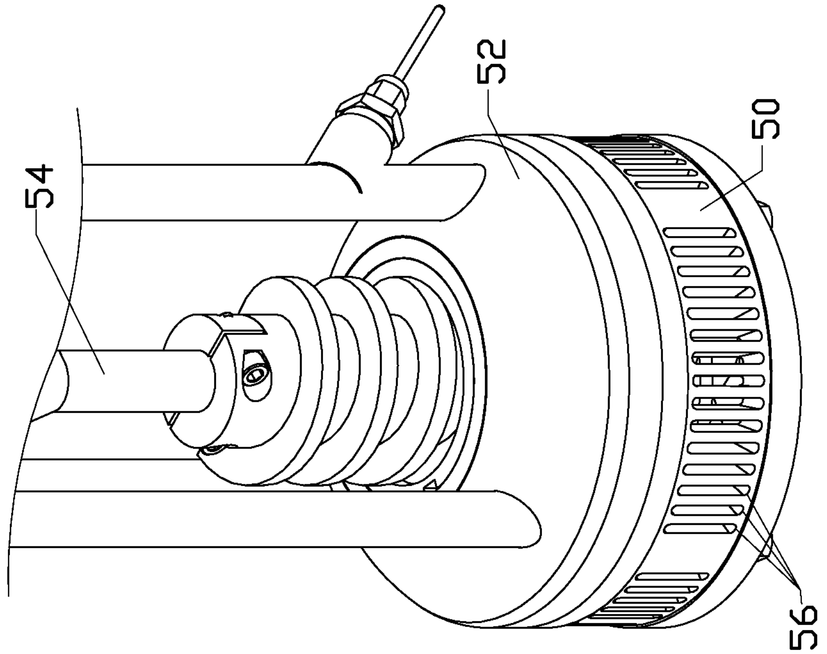
PRIOR ART FIG. 12
FIG. 12 is a perspective view of a prior art rotor-stator assembly.

FIG. 12 illustrates a commonly used stator element 50 positioned on rack dome assembly 52 of an agglomerate mixing apparatus with drive shaft 54. Stator element 52 has standard straight slot openings 56. FIG. 13 illustrates stator element 8*a* of the present invention positioned on rack dome assembly 22 with driveshaft 12. Stator element 8*a* has slot openings 40*a*, as previously described with reference to FIGS. 6-8.

FIGS. 14 and 15 and FIGS. 16 and 17 compare the agglomerate flow patterns of mixers utilizing a current stator element with straight slot openings and a mixer employing the stator element of the present invention.

Figure 14:
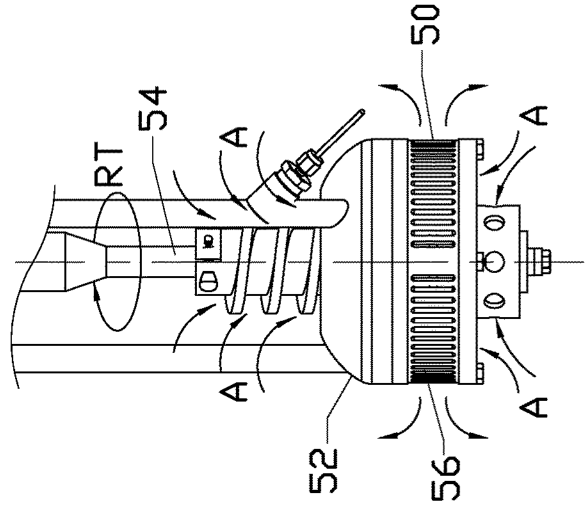
FIG. 14 is an elevation view of the prior art rotor-stator assembly in FIG. 11, illustrating agglomerate dispersal flow patterns.
Figure 15:
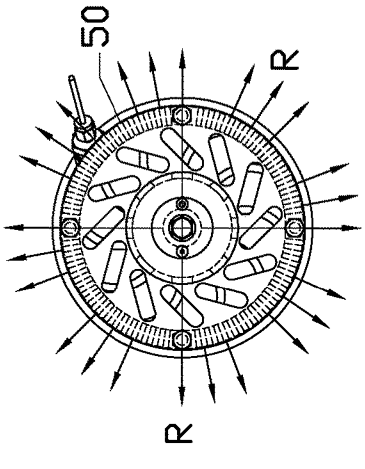
FIG. 15 is the bottom view of the prior art rotor-stator assembly in FIG. 11, illustrating the agglomerate dispersal radial flow patterns emanating from the stator element.
Figure 16:
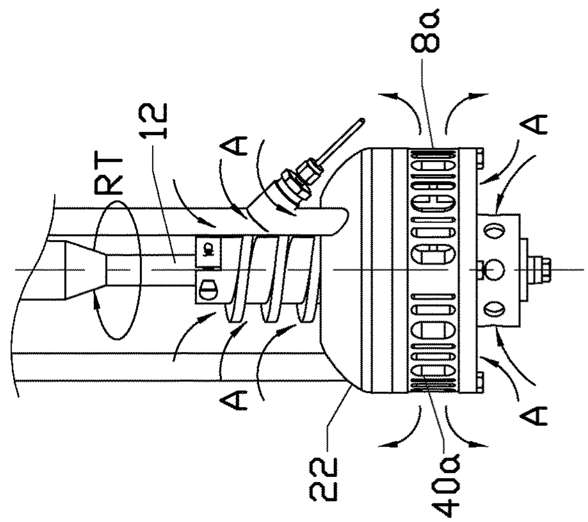
FIG. 16 is an elevation view of the rotor-stator assembly of the present invention, illustrating agglomerate dispersal flow patterns.
Figure 17:
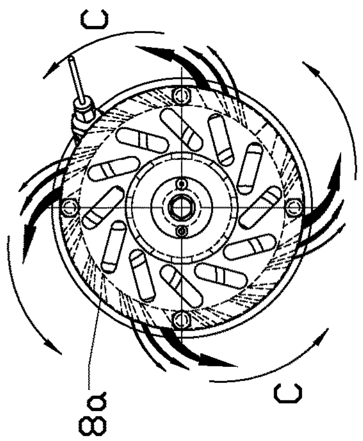
FIG. 17 is the bottom view of the rotor-stator assembly of the present invention, illustrating the agglomerate dispersal circumferential flow patterns emanating from the stator element.

FIGS. 14 and 16 indicate that dispersal of agglomerate is initiated by rotation RT of driveshafts 12 and 54, respectively. This compels the flow of agglomerate A into rack dome assemblies 22 and 52. However, as illustrated in FIG. 15, prior art stator element 52 with standard straight slot openings 56 emits agglomerate in a radial flow pattern R. While, as seen in FIG. 17, the unique stator element 8*a* with its inwardly slanted slot openings 40*a* of the present invention discharges agglomerate in an advantageous circumferential flow pattern C, thereby vastly improving cutting effectiveness of agglomerate from larger agglomerate pieces to smaller agglomerate material, to smallest, particle size agglomerates. This improvement in dispersal effectiveness enhances shear and flow, which decreases the temperatures of the agglomerate being affected, both in uniformity and acceleration.

In summation, by increasing the available exit slot openings in subsequent size variation and changing their angle of discharge, enhanced rotor-stator agglomerate dispersal performance and reduced process temperatures are achieved. Improved temperature control through the use of strategically placed jackets adds yet another level of performance improvement.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A rotor-stator system for an agglomerate mixing apparatus, said system comprising:

an agglomerate mixing tank;

a driveshaft for rotating a rotor element positioned in the mixing tank and located within a stator element, the rotor element and the stator element comprising a rotor-stator assembly, wherein said stator element comprises:

a circular stator body having an inside open area, a top surface, an inner circumference, an outer circumference, an interior surface extending around the entire inner circumference of the body, an exterior surface extending around the entire outer circumference of the body, and a plurality of individual slot opening patterns extending through the body from the interior surface to the exterior surface, each of the individual slot opening patterns comprising a large slot opening in lateral alignment with and adjacent to a small slot opening which itself is in lateral alignment with and adjacent to a smallest slot opening, the plurality of slot opening patterns circumscribing the outer circumference of the stator body, with each of the individual slot opening patterns laterally adjacent to and sequentially following another of the individual slot opening patterns, each of the slot openings having inside walls which are slanted inward towards the open area at an acute attack angle in relation to the top surface of the stator body.

2. The rotor-stator system for an agglomerate mixing apparatus as in claim 1 wherein each of the plurality of slot openings is an elongated aperture, the plurality of said apertures being located as in parallel alignment around the outer circumference of the stator body.

3. The roto-stator system for an agglomerate mixing apparatus as in claim 1 whereby upon the immersion of the rotor-stator assembly into agglomerate in the mixing tank, rotation of the rotor element within the stator element results in the increased cutting and slicing of agglomerate in the tank, the agglomerate being reduced in size by the large slot openings, then further reduced in size by the small slot openings, and then further reduced in size to agglomerate particles by the smallest slot openings, thereby limiting mixing turbulence, heat build-up, and viscosity within the mixing tank by said rapid reduction in size of large agglomerate into small agglomerate particles exiting from the stator in designed circumferential flow patterns.

4. A rotor-stator system for an agglomerate mixing apparatus, said system comprising:

an agglomerate mixing tank;

a driveshaft for rotating a rotor element positioned in the mixing tank and located within a stator element, the rotor element and the stator element comprising a rotor-stator assembly, wherein said stator element comprises:

a circular stator body having an inside open area, a top surface, an inner circumference, an outer circumference, an interior surface extending around the entire inner circumference of the body, an exterior surface extending around the entire outer circumference of the body, and a plurality of slot openings extending through the body from the interior surface to the exterior surface, each of the slot openings having inside walls which are slanted inward towards the open area at an acute attack angle in relation to the top surface of the stator body and each of the plurality of slot openings is shaped as a stylized "H," the plurality of said "H" shaped slot openings being located in uniform alignment around the outer circumference of the stator body.

5. The rotor-stator system for an agglomerate mixing apparatus as in claim 4 wherein the stylized "H" shaped slot openings are different sizes.

6. A rotor-stator system for an agglomerate mixing apparatus, said system comprising:

a driveshaft for rotating a rotor element positioned in the mixing tank and located within a stator element, the rotor element and the stator element comprising a rotor-stator assembly, wherein said stator element comprises:

a circular stator body having an inside open area, a top surface, an inner circumference, an outer circumference, an interior surface extending around the entire inner circumference of the body, an exterior surface extending around the entire outer circumference of the body, and a plurality of slot openings extending through the body from the interior surface to the exterior surface, each of the plurality of slot openings having inside walls which are slanted inward towards the open area at an acute attack angle in relation to the top surface of the stator body, each of the plurality of slot openings comprising elongated apertures, and "H" shaped slot openings in parallel alignment around the outer circumference of the stator body.

* * * * *